(12) United States Patent
Kobayashi

(10) Patent No.: US 10,360,256 B2
(45) Date of Patent: Jul. 23, 2019

(54) MICROSCOPE-IMAGE BROWSING SYSTEM

(71) Applicant: OLYMPUS CORPORATION, Tokyo (JP)

(72) Inventor: Mina Kobayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 218 days.

(21) Appl. No.: 15/421,666

(22) Filed: Feb. 1, 2017

(65) Prior Publication Data

US 2017/0270143 A1    Sep. 21, 2017

(30) Foreign Application Priority Data

Mar. 18, 2016   (JP) ................................. 2016-054683

(51) Int. Cl.

| | |
|---|---|
| G06F 7/02 | (2006.01) |
| G06F 16/00 | (2019.01) |
| G06F 16/54 | (2019.01) |
| G06F 16/904 | (2019.01) |
| G06T 1/00 | (2006.01) |
| G06T 3/40 | (2006.01) |

(52) U.S. Cl.
CPC ............ *G06F 16/54* (2019.01); *G06F 16/904* (2019.01); *G06T 1/0007* (2013.01); *G06T 3/4038* (2013.01)

(58) Field of Classification Search
CPC ...... G02B 21/365; G02B 21/367; G06T 7/70; G06T 1/0007; G06F 17/30274; G06F 17/30994; G06F 16/54; G06F 16/904
See application file for complete search history.

(56) References Cited

U.S. PATENT DOCUMENTS

2002/0075404 A1    6/2002  Kubo et al.
2010/0253774 A1*  10/2010  Yoshioka ............... G02B 21/16
                                                        348/79

(Continued)

FOREIGN PATENT DOCUMENTS

| JP | 2002-112199 A | 4/2002 |
|---|---|---|
| JP | 3974318 B2 | 9/2007 |

(Continued)

*Primary Examiner* — Bruce M Moser
(74) *Attorney, Agent, or Firm* — Scully, Scott, Murphy & Presser, P.C.

(57) ABSTRACT

Provided is a microscope-image browsing system including: a server that stores multidimensional microscope images; and one or more client terminals that are connected to the server via a network, wherein each of the client terminals is provided with: an input portion with which microscope images and a playback direction are input; an information-transmitting portion that transmits the input information about the microscope images and the playback direction; an image-receiving portion that receives the microscope images; a storage portion that stores the received microscope images; and an image-playing-back portion that plays back the stored microscope images, and wherein the server is provided with: an information-receiving portion that receives the information transmitted thereto from the information-transmitting portion; and an image-delivering portion that, on the basis of the received information about the microscope images and the playback direction, preferentially delivers the microscope images arrayed in the playback direction.

4 Claims, 9 Drawing Sheets

(56) References Cited

U.S. PATENT DOCUMENTS

| | | | |
|---|---|---|---|
| 2011/0154189 A1 | 6/2011 | Yano | |
| 2012/0007977 A1* | 1/2012 | Yamamoto | G02B 21/367 348/79 |
| 2012/0057777 A1* | 3/2012 | Uemori | H04N 19/176 382/154 |
| 2015/0221105 A1* | 8/2015 | Tripathi | G06T 19/00 382/131 |
| 2016/0170193 A1* | 6/2016 | Ue | G02B 21/0072 359/385 |

FOREIGN PATENT DOCUMENTS

| | | |
|---|---|---|
| JP | 2011-129062 A | 6/2011 |
| JP | 5361697 B2 | 12/2013 |

\* cited by examiner

MICROSCOPE-IMAGE BROWSING SYSTEM

CROSS-REFERENCE TO RELATED APPLICATIONS

This application is based on Japanese Patent Application No. 2016-054683, the contents of which are incorporated herein by reference.

The present invention relates to a microscope-image browsing system.

BACKGROUND ART

In the related art, there is a known system in which a display control device that performs display control so that a plurality of images are displayed by being allocated to a single page performs preloading whereby, when a page is displayed, images to be displayed on a page other than the displayed page are loaded and stored in a temporary storage means when switching the displayed page to another page in accordance with user operations (for example, see Patent Literature 1).

CITATION LIST

Patent Literature

{PTL 1} Japanese Unexamined Patent Application, Publication No. 2011-129062

SUMMARY OF INVENTION

An aspect of the present invention is a microscope-image browsing system including: a server that stores multidimensional microscope images; and one or more client terminals that are connected to the server via a network, wherein each of the client terminals is provided with: an input portion that inputs information about the microscope images for which delivery is requested and a playback direction therefor; an information-transmitting portion that transmits the input information about the microscope images and the playback direction; an image-receiving portion that receives the microscope images delivered from the server; a storage portion that stores the microscope images received by the image-receiving portion; and an image-playing-back portion that plays back the microscope images stored in the storage portion, and wherein the server is provided with: an information-receiving portion that receives the information transmitted thereto from the information-transmitting portion; and an image-delivering portion that, on the basis of the information about the microscope images and the playback direction received by the information-receiving portion, preferentially delivers the microscope images that are arrayed in the playback direction among the microscope images corresponding to the information.

DESCRIPTION OF EMBODIMENT

A microscope-image browsing system 1 according to an embodiment of the present invention will be described below with reference to the drawings.

Figure 1:
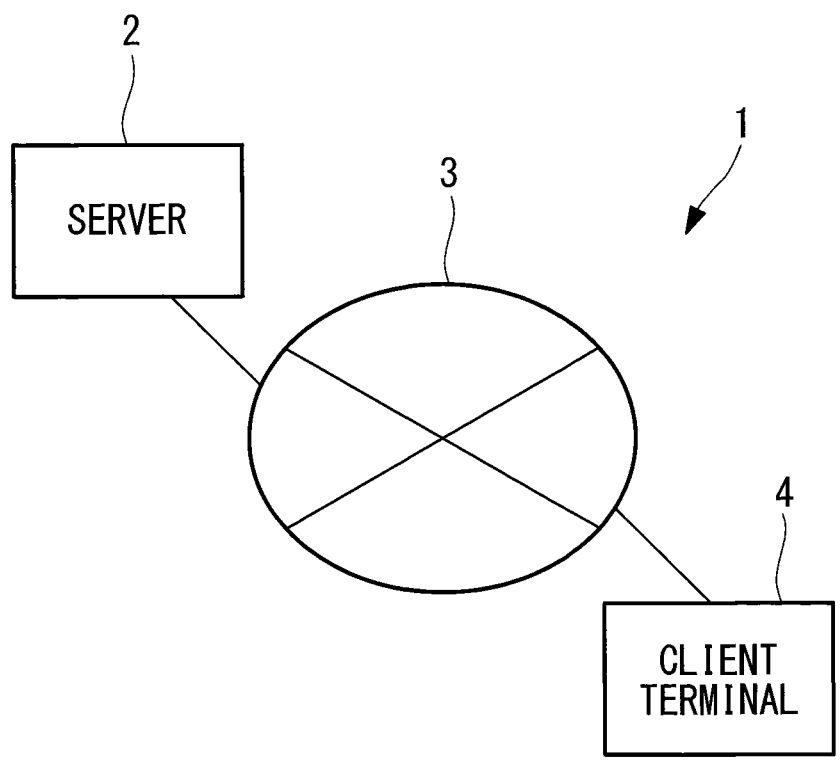
FIG. 1 is a block diagram showing a microscope-image browsing system according to an embodiment of the present invention.

As shown in FIG. 1, the microscope-image browsing system 1 according to this embodiment is provided with: a server 2 that stores and delivers microscope images; and one or more client terminals 4 that are connected to the server 2 via a network 3.

Figure 2:
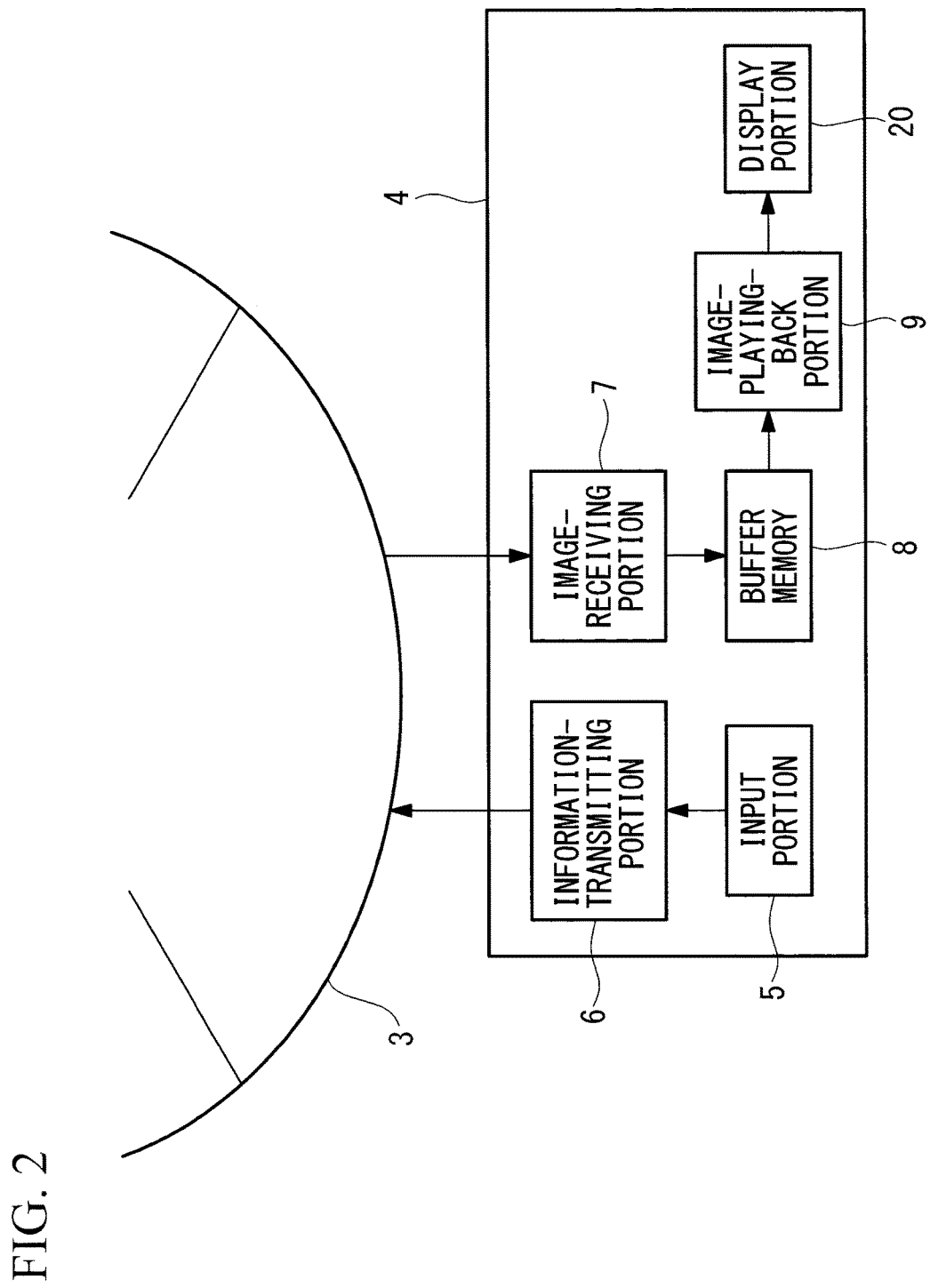
FIG. 2 is a block diagram showing a client terminal of the microscope-image browsing system in FIG. 1.

As shown in FIG. 2, the client terminal 4 is, for example, a PC (personal computer) and is provided with: an input portion 5 with which information is input; an information-transmitting portion 6 that transmits the information input by using the input portion 5 via the network 3; an image-receiving portion 7 that receives the microscope images delivered thereto from the server 2; a buffer memory (storage portion) 8 that stores the microscope images received by the image-receiving portion 7; an image-playing-back portion 9 that plays back the microscope images stored in the buffer memory 8; and a display portion 20 that displays the microscope images played back by the image-playing-back portion 9.

The input portion 5 is an input device, such as a mouse, a keyboard, a touchscreen, or the like, for inputting microscope-image information that identifies microscope images for which delivery is requested, playback-starting-position information that specifies a playback-starting position, and playback-direction information that specifies the dimension indicating the playback direction of the microscope images.

Figure 3:
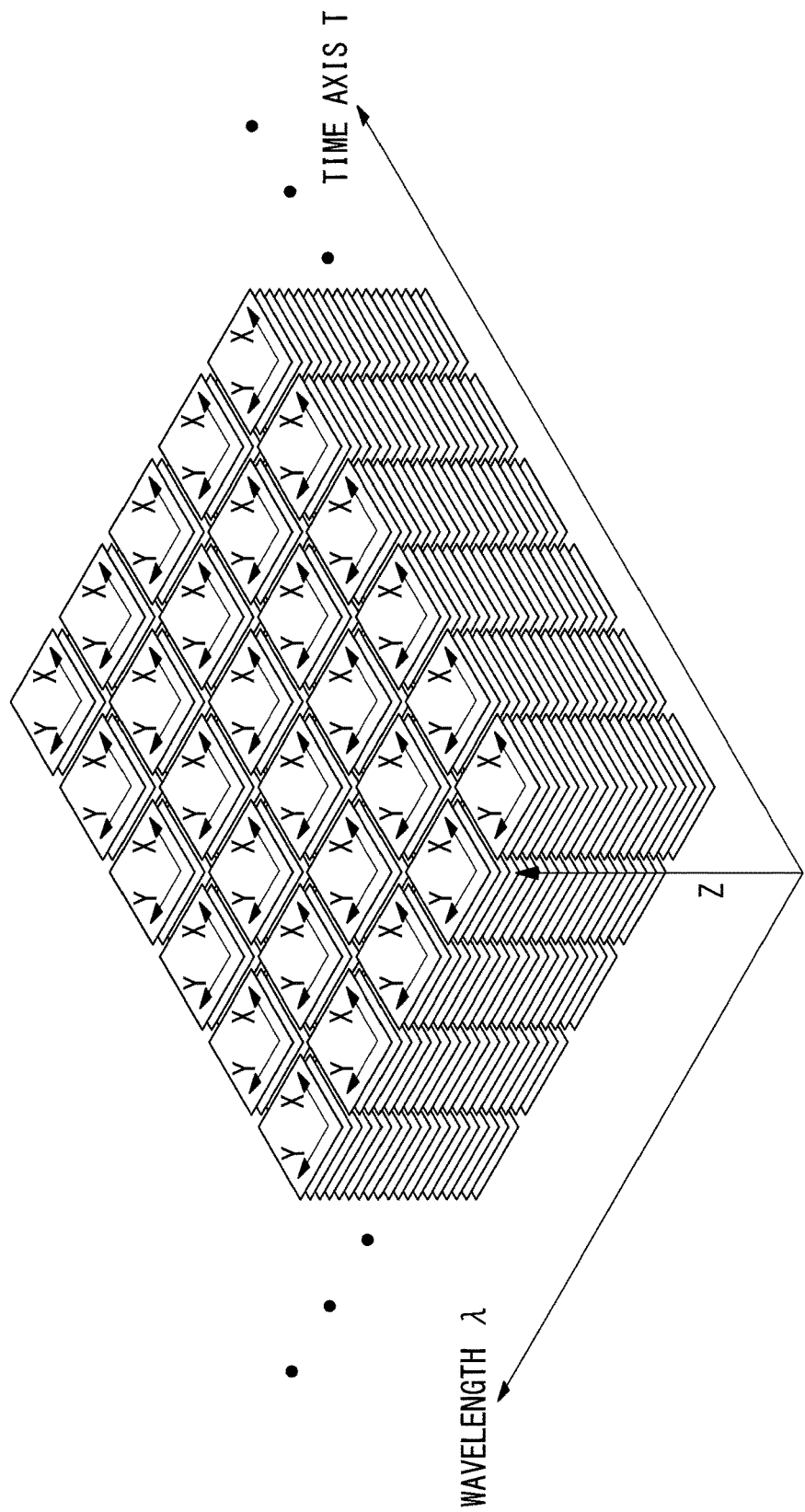
FIG. 3 is a diagram showing an example of arraying of microscope images to be browsed by using the microscope-image browsing system in FIG. 1.

As shown in FIG. 3, the microscope images have, for example, three dimensions Z, T, and λ that are set by arraying, in a time-axis (T) direction and a frequency (λ) direction, a plurality of bundles of two-dimensional images in the X-Y directions parallel to the focal plane of the microscope objective lens, in which the images in the bundles are arrayed in the Z-direction, that is, the optical-axis direction of the objective lens.

The display portion 20 is, for example, a monitor and is configured so that one microscope image is displayed at the center of a screen. The microscope image displayed on this display portion 20 is, for example, switched to images in the time-axis T-direction by pressing arrow keys for the left and right directions on a keyboard, which is the input portion 5, and is switched to images in the Z-directions by pressing arrow keys for the up and down directions.

Every time the microscope images are switched by using the input portion 5, the microscope-image information and the playback-starting-position information of the microscope images displayed on the display portion 20 are transmitted from the information-transmitting portion 6.

The display portion 20 is configured so as to display, at an end of the screen, special one-direction-playback arrow buttons corresponding to playback directions Z and T for restricting the playback directions to a certain direction by using, for example, a mouse, which is the input portion 5.

By pressing one of the arrow buttons corresponding to the playback directions Z and T on the display portion 20 by using the mouse, which is the input portion 5, playback-direction information that indicates the selected playback direction Z or T is transmitted from the information-transmitting portion 6.

Figure 4:
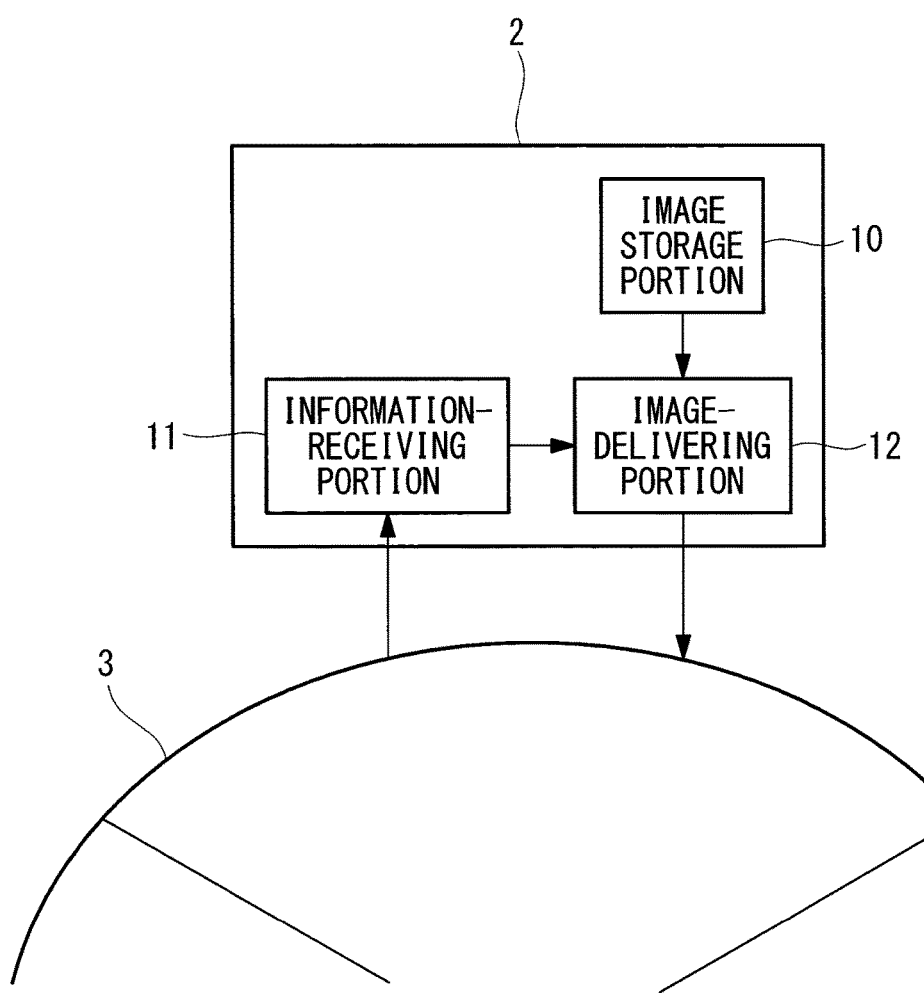
FIG. 4 is a block diagram showing a server of the microscope-image browsing system in FIG. 1.

As shown in FIG. 4, the server 2 is provided with: an image storage portion 10 that stores the microscope images; an information-receiving portion 11 that receives the information transmitted thereto from the information-transmitting portion 6 via the network 3; and an image-delivering portion 12 that selects microscope images corresponding to the received information and that delivers the selected images via the network 3.

The image-delivering portion 12 selects microscope images specified by the microscope-image information received by the information-receiving portion 11 from the microscope images stored in the image storage portion 10, and delivers the selected images.

In this embodiment, in the case in which the information-receiving portion 11 receives the playback-starting-position information and the playback-direction information, the image-delivering portion 12 selects, from among the specified microscope images, only the microscope images arrayed in the playback direction indicated by the playback-direction information starting from the microscope image at the playback-starting position indicated by the playback-starting-position information, and delivers the selected images.

In the case in which the information-receiving portion 11 does not receive the playback-direction information, the image-delivering portion 12 evenly selects, among the specified microscope images, the microscope images arrayed in all playback directions Z and T starting from the microscope image at the playback-starting position indicated by the playback-starting-position information, and delivers the selected images.

In the case in which the information-receiving portion 11 receives only the microscope-image information that specifies microscope images, the image-delivering portion 12 evenly selects the microscope images arrayed in all playback directions Z and T starting from a microscope image that serves as a reference among the specified microscope images, and delivers the selected images.

The operation of the thus-configured microscope-image browsing system 1 according to this embodiment will be described below.

By using the microscope-image browsing system 1 according to this embodiment, first, the information-transmitting portion 6 transmits to the server 2, via the network 3, microscope-image information of microscope images set in advance to be initially displayed on the display portion 20, and the server 2 receives the microscope-image information transmitted thereto by means of the information-receiving portion 11.

Figure 5:
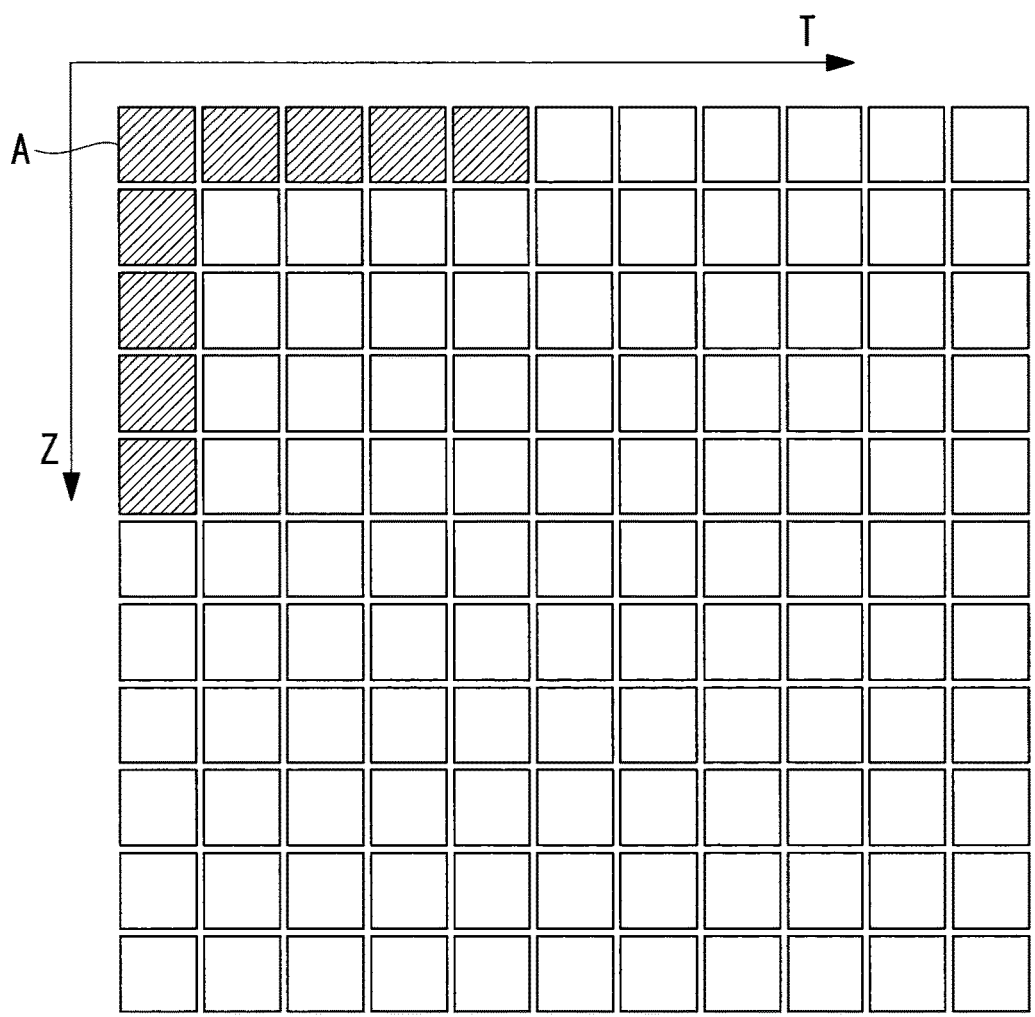
FIG. 5 is a diagram showing example images to be delivered when the playback direction is not specified, in the microscope-image browsing system in FIG. 1.

The image-delivering portion 12 of the server 2 selects the microscope images indicated by the received microscope-image information from a plurality of microscope-image bundles stored in the image storage portion 10 and also evenly selects and delivers a plurality of microscope images arrayed in all playback directions Z and T starting from a microscope image (reference image) A that serves as a reference in that microscope-image bundle (for example, four in the Z-direction and four in the T-direction starting from the reference image A, as indicated by shading in FIG. 5).

The microscope images delivered via the network 3 from the server 2 are received by the image-receiving portion 7 of the client terminal 4 and are played back by the image-playing-back portion 9 after temporarily being stored in the buffer memory 8. Among the delivered microscope images, the playback by the image-playing-back portion 9 starts from the reference image A. Then, a viewer subsequently inputs the playback direction (up, down, left, or right direction) by using a keyboard, which is the input portion 5, and thus, the microscope images that are arrayed in the input playback direction are sequentially played back.

Each time the viewer changes the microscope images displayed on the display portion 20 by using the keyboard, which is the input portion 5, the information-transmitting portion 6 transmits the microscope-image information for the new microscope image to be displayed on the display portion 20 and the playback-starting-position information to the information-receiving portion 11.

The image-delivering portion 12 of the server 2 uses the microscope image corresponding to the new microscope-image information received by the information-receiving portion 11 as the reference image, evenly selects a plurality of microscope images arrayed in all playback directions Z and T starting from this reference image, and delivers the microscope images that have not been delivered among the selected microscope images to the client terminal 4.

In this case, because not only the reference image A but also the microscope images in all playback directions Z and T with reference to the reference image A are evenly delivered from the server 2, there is an advantage in that it is possible to quickly start the playback in a given playback direction regardless of the playback direction input by the viewer.

On the other hand, when one of the special one-direction-playback arrow buttons corresponding to the playback directions Z and T on the display portion 20 is pressed by using a mouse, which is the input portion 5, in a state in which the microscope image (reference image) A is displayed, the input playback-direction information is transmitted to the server 2 from the information-transmitting portion 6 via the network 3, the playback-direction information is received by the information-receiving portion 11 of the server 2, and is used to select the next microscope images to be delivered by the image-delivering portion 12. In other words, the image-delivering portion 12 preferentially selects and delivers the microscope images arrayed in the playback direction.

Figure 6:
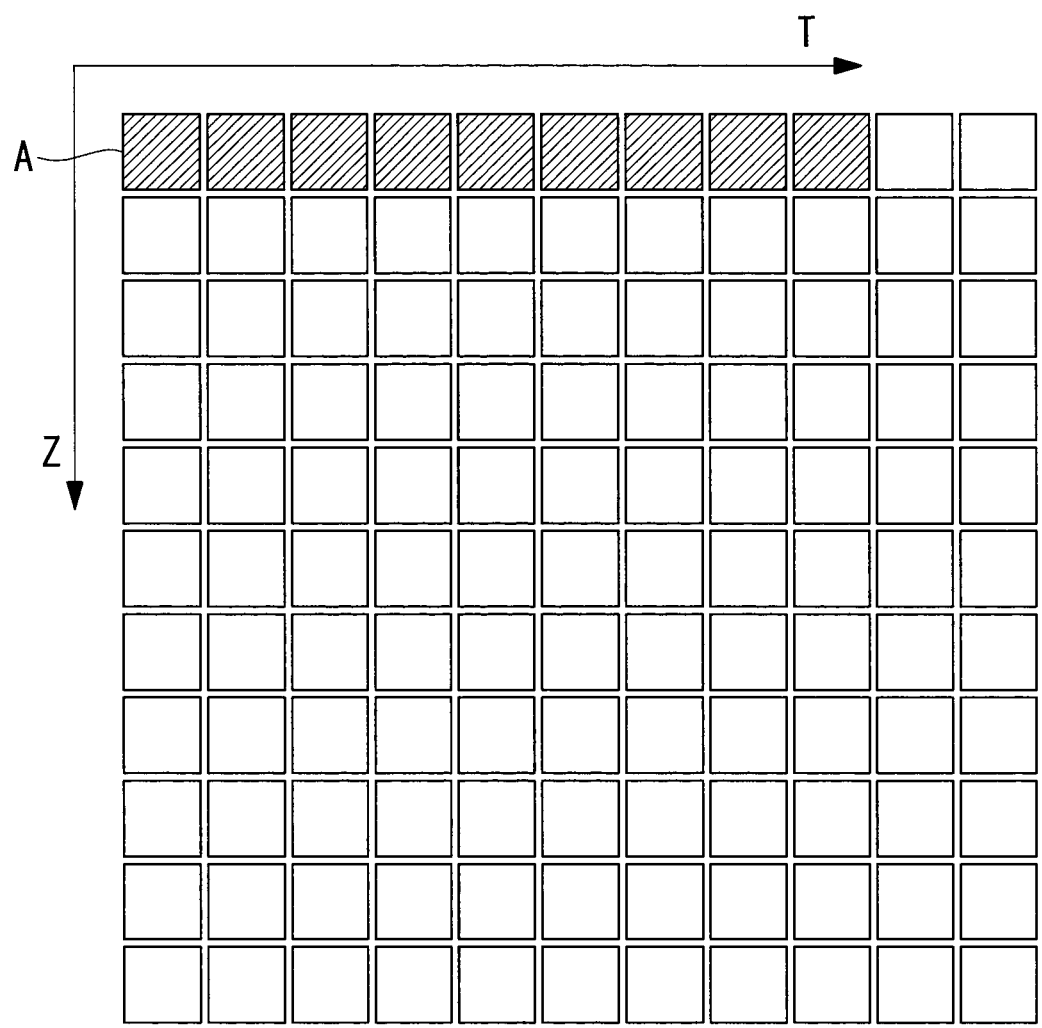
FIG. 6 is a diagram showing example images to be delivered when the playback direction is specified, in the microscope-image browsing system in FIG. 1.

In the example shown in FIG. 6, when the time-axis T is input as the playback direction, only the images arrayed in the time-axis T-direction starting from the reference image A (for example, eight images in the T-direction starting from the reference image A, as shown by shading in FIG. 6) are selected.

By doing so, because the preferentially-selected microscope images arrayed in the playback direction are received by the client terminal 4 and stored in the buffer memory 8, there is an advantage in that the image-playing-back portion 9 can smoothly play back the microscope images in the specified playback direction.

Specifically, once a playback direction is input, it is highly unlikely that microscope images are subsequently played back in other playback directions, and therefore, by eliminating delivery of microscope images that are not needed for playback as much as possible, playback can be performed smoothly even if the storage capacity of the buffer memory 8 is low.

When the viewer inputs the playback-starting-position information that indicates the playback-starting position of the microscope images by using the input portion 5, the image-delivering portion 12 of the server 2 uses the microscope image at the playback-starting position indicated by the playback-starting-position information as the reference image A and delivers the microscope images that are arrayed in the playback direction therefrom. By doing so, the viewer can browse desired microscope images by smoothly playing back the images in the desired playback direction from the desired playback position.

In this embodiment, although only images arrayed in a playback direction are delivered when the playback direction is input, there is no limitation thereto. Specifically, because it suffices that the input playback direction be prioritized, the images arrayed in the playback direction may be delivered by selecting these images in a greater number as compared with the images arrayed in other directions.

In this embodiment, in the case in which there is no input for the playback direction, it is permissible to additionally deliver images in a direction other than the Z-direction and the T-direction, that is, a direction between the Z-direction and the T-direction (i.e., a diagonal direction).

In this embodiment, although a keyboard and a mouse are used as the input portions 5, a touchscreen may be used as the input portion 5 such that swiping is used for playback in all directions including up, down, left, and right directions and flicking is used for playback in one direction.

By doing so, it is possible to easily switch between all-direction playback and one-direction playback.

In this embodiment, a button for selecting an all-direction playback mode and a one-direction playback mode may be displayed on the screen of the display portion 20, and it may be possible for the viewer to switch between the all-direction playback mode and the one-direction playback mode by pressing the button.

Figure 7:
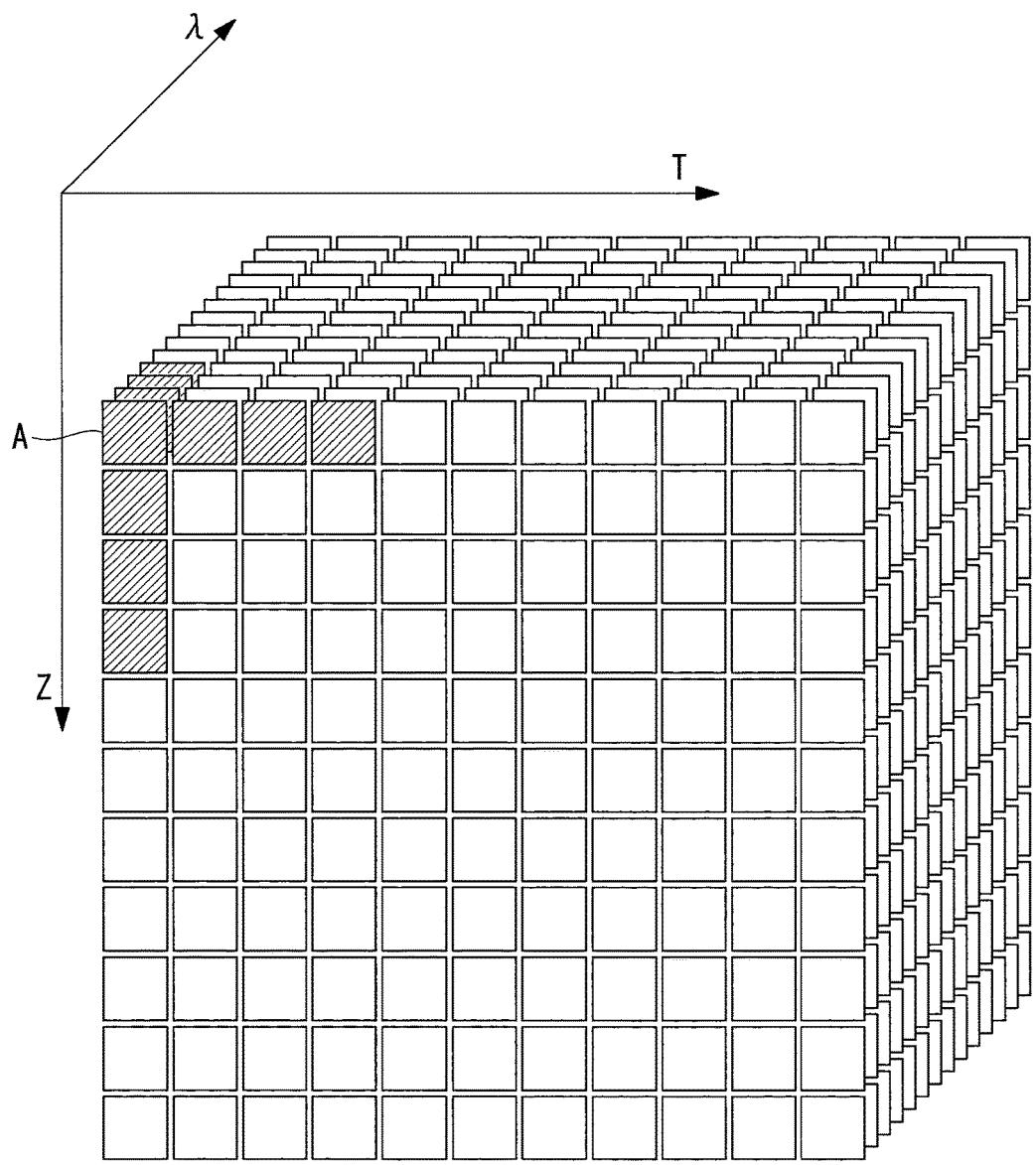
FIG. 7 is a diagram showing another example of images to be delivered when the playback direction is not specified, in the microscope-image browsing system in FIG. 1.
Figure 8:
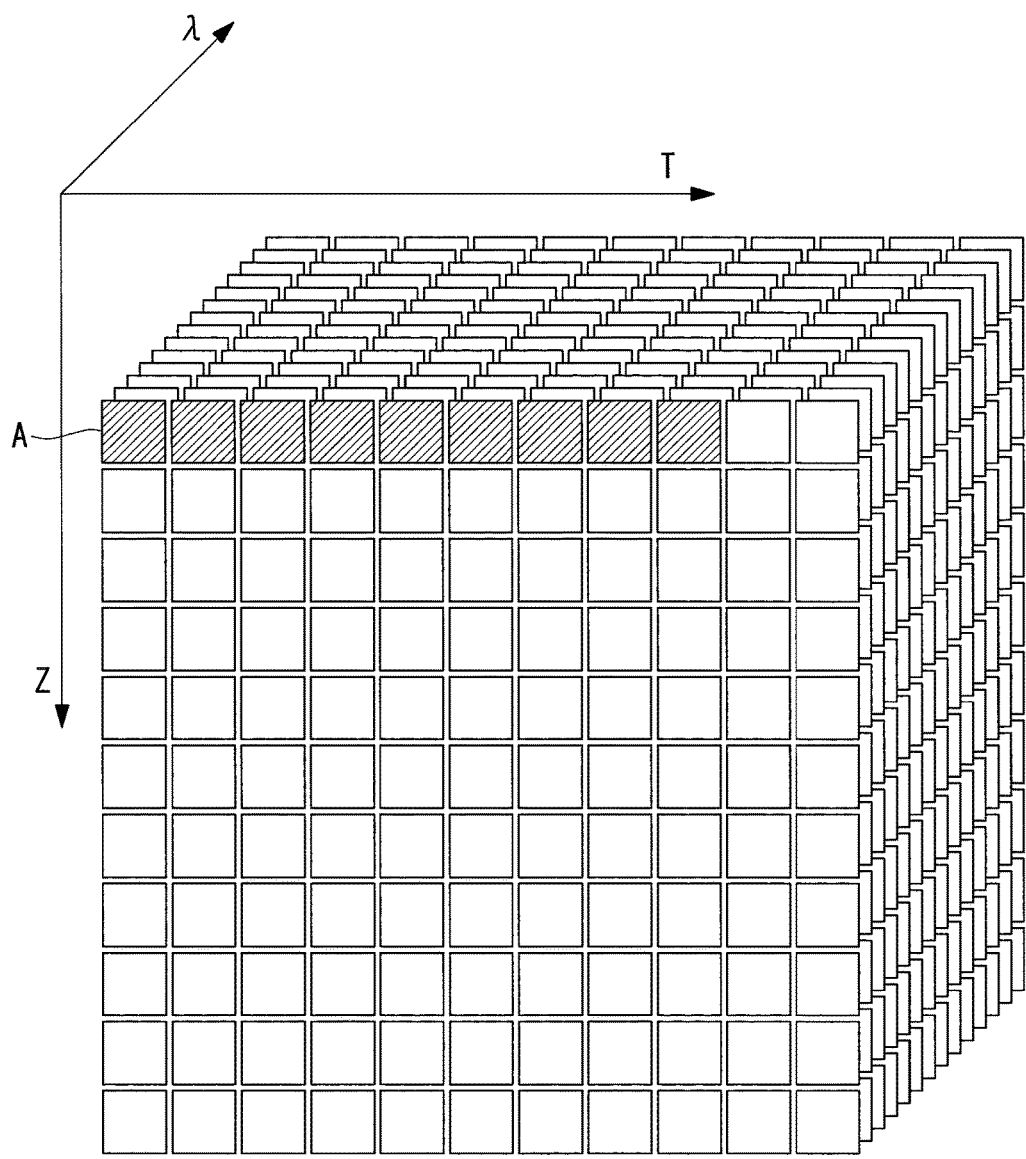
FIG. 8 is a diagram showing another example of images to be delivered when the playback direction is specified, in the microscope-image browsing system in FIG. 1.

In this embodiment, although the two dimensions Z and T are used as the playback directions, there is no limitation thereto, and three dimensions Z, T, and λ may be used, as shown in FIGS. 7 and 8.

Figure 9:
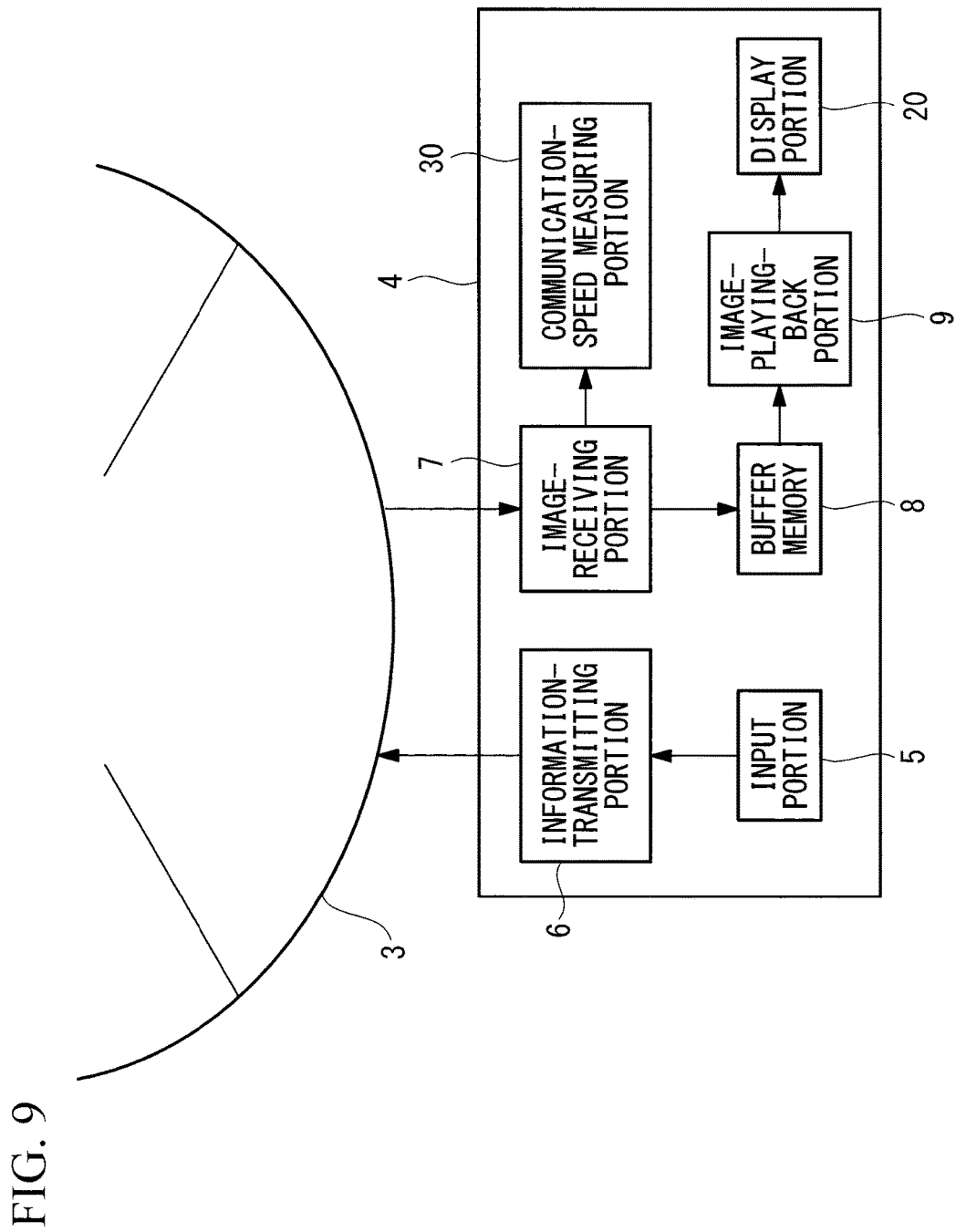
FIG. 9 is a block diagram showing another client terminal of the microscope-image browsing system in FIG. 1.

In this embodiment, as shown in FIG. 9, the client terminal 4 may be provided with a communication-speed measuring portion 30 that measures the communication speed, and the image-playing-back portion 9 of the client terminal 4 may play back the microscope images at a playback speed lower than the communication speed measured by the communication-speed measuring portion.

The communication-speed measuring portion 30 may estimate the communication time on the basis of the delivery time from the image-delivering portion 12 to the image-receiving portion 7 when the microscope images are initially delivered to the image-receiving portion 7 from the image-delivering portion 12 and the volumes of the microscope images, or a signal may be transmitted to the server 2 from the client terminal 4 and the communication speed may be estimated on the basis of the round-trip delay time, that is, the amount of time the transmitted signal takes to return to the client terminal 4 from the server 2 after the transmission thereof.

In this embodiment, although the communication-speed measuring portion 30 is provided in the client terminal 4, the communication-speed measuring portion 30 may be provided in the server 2.

By doing so, the image-playing-back portion 9 can play back the microscope images at a certain playback speed without changing the playback speed in the middle of playback.

In the case in which the communication speed measured by the communication-speed measuring portion 30 begins to decrease, the speed may be automatically or manually adjusted via the client terminal 4, or the playback may be temporarily stopped to be restarted after being put in stand-by until a predetermined number of microscope images are accumulated. In the case in which the communication speed is greatly decreased, the image-delivering portion 12 of the server 2 may deliver the microscope images to be delivered after compressing the images or after skipping a certain number of images.

Aspects described below are derived from the above-described embodiment.

An aspect of the present invention is a microscope-image browsing system including: a server that stores multidimensional microscope images; and one or more client terminals that are connected to the server via a network, wherein each of the client terminals is provided with: an input portion that inputs information about the microscope images for which delivery is requested and a playback direction therefor; an information-transmitting portion that transmits the input information about the microscope images and the playback direction; an image-receiving portion that receives the microscope images delivered from the server; a storage portion that stores the microscope images received by the image-receiving portion; and an image-playing-back portion that plays back the microscope images stored in the storage portion, and wherein the server is provided with: an information-receiving portion that receives the information transmitted thereto from the information-transmitting portion; and an image-delivering portion that, on the basis of the information about the microscope images and the playback direction received by the information-receiving portion, preferentially delivers the microscope images that are arrayed in the playback direction among the microscope images corresponding to the information.

With this aspect, when the microscope images for which delivery is to be requested and the playback direction therefor are input via the input portion of the client terminal, the information-transmitting portion transmits the input information about the microscope images and the playback direction to the server via the network. In the server, the information-receiving portion receives the information transmitted thereto by the information-transmitting portion, and the microscope images to be delivered are determined on the basis of the received information. Specifically, the image-delivering portion preferentially delivers the microscope images arrayed in the playback direction among the requested microscope images.

When the image-receiving portion receives the microscope images delivered thereto from the server, the received microscope images are played back by the image-playing-back portion after the received microscope images are stored in the storage portion. In this case, because the microscope images that are not arrayed in the playback direction are delivered later, the volumes of the microscope images to be stored in the storage portion at a time may be low. Also, because the microscope images that are arrayed in the playback direction and that are needed for playback are preferentially delivered and stored in the storage portion, it is possible to smoothly play back the images by means of the image-playing-back portion.

In the above-described aspect, in the case in which the playback-direction information is not transmitted thereto from the information-transmitting portion, the image-delivering portion may evenly deliver the microscope images arrayed in correspondence with multidimensional playback directions.

By doing so, in the state in which the playback direction has not been set, it is possible to start the playback in the playback direction of any dimension. Then, once the playback direction is set, because the microscope images in that playback direction are preferentially delivered, it is possible to smoothly play back the images even with a low storage capacity.

In addition, in the above-described aspect, the server or the client terminal may be provided with a communication-speed measuring portion that is configured so as to measure the communication speed, and the image-playing-back portion may play back the microscope images at a playback speed lower than the communication speed measured by the communication-speed measuring portion.

By doing so, it is possible to more reliably play back the microscope images in a desired playback direction at a certain playback speed even with a low storage capacity.

REFERENCE SIGNS LIST 1 microscope-image browsing system
2 server
3 network
4 client terminal
5 input portion
6 information-transmitting portion
7 image-receiving portion
8 buffer memory (storage portion)
9 image-playing-back portion
11 information-receiving portion
12 image-delivering portion
Z, T, λ playback direction

The invention claimed is:

1. A microscope-image browsing system comprising:
a server configured to:
   access a storage storing a two-or-more-dimensional array of microscope images,
      wherein dimensions of the two-or-more-dimensional array comprise:
         a first dimension representing a time at which each of the microscope images is acquired; and
         a second dimension representing a depth in an optical-axis direction in which each of the microscope images is acquired;
   receive, from a client terminal connected to the server via a network, a first request corresponding to a first reference microscope image of the microscope images;
   in response to receiving the first request:
      select, as a first batch of the microscope images, the first reference microscope image and a first pre-determined number of the microscope images from the first reference microscope image in at least each of the first dimension and the second dimension of the two-or-more-dimensional array of microscope images; and
      transmit each of the microscope images of the first batch of the microscope images, that have not been previously transmitted, to the client terminal for displaying the first reference microscope image and a next microscope image in the first batch in a first user-designated playback direction corresponding to one of the first dimension and the second dimension;
   receive, from the client terminal a second request corresponding to a second user-designated playback direction corresponding to one of the first dimension and the second dimension; and
   in response to receiving the second request:
      select, as a second batch of the microscope images, a second reference microscope image and a second predetermined number of the microscope images from the second reference microscope image in the first dimension or the second dimension corresponding to the second user-designated playback direction; and
      transmit each of the microscope images of the second batch of the microscope images, that have not been previously transmitted, to the client terminal for displaying the second reference microscope image and a next microscope image in the second batch in the second user-designated playback direction.

2. A microscope-image browsing system according to claim 1, comprising the client terminal,
wherein the server or the client terminal is configured to measure communication speed, and
wherein the client terminal is configured to display the microscope images transmitted from the server at a playback speed that is lower than the communication speed measured.

3. A method comprising:
accessing a storage storing a two-or-more-dimensional array of microscope images,
   wherein dimensions of the two-or-more-dimensional array comprise:
      a first dimension representing a time at which each of the microscope images is acquired; and
      a second dimension representing a depth in an optical-axis direction in which each of the microscope images is acquired;
receiving, from a client terminal connected via a network, a first request corresponding to a first reference microscope image of the microscope images;
in response to receiving the first request:
   selecting, as a first batch of the microscope images, the first reference microscope image and a first predetermined number of the microscope images from the first reference microscope image in at least each of the first dimension and the second dimension of the two-or-more-dimensional array of microscope images; and
   transmitting each of the microscope images of the first batch of the microscope images, that have not been previously transmitted, to the client terminal for displaying the first reference microscope image and a next microscope image in the first batch in a first user-designated playback direction corresponding to one of the first dimension and the second dimension;
receiving, from the client terminal a second request corresponding to a second user-designated playback direction corresponding to one of the first dimension and the second dimension; and
in response to receiving the second request:
   selecting, as a second batch of the microscope images, a second reference microscope image and a second predetermined number of the microscope images from the second reference microscope image in the first dimension or the second dimension corresponding to the second user-designated playback direction; and transmitting each of the microscope images of the second batch of the microscope images, that have not been previously transmitted, to the client terminal for displaying the second reference microscope image and a next microscope image in the second batch in the second user-designated playback direction.

4. A computer-readable storage device storing instructions that cause a computer to perform, at least:

accessing a storage storing a two-or-more-dimensional array of microscope images,
wherein dimensions of the two-or-more-dimensional array comprise:
a first dimension representing a time at which each of the microscope images is acquired; and
a second dimension representing a depth in an optical-axis direction in which each of the microscope images is acquired;

receiving, from a client terminal connected via a network, a first request corresponding to a first reference microscope image of the microscope images;

in response to receiving the first request:
selecting, as a first batch of the microscope images, the first reference microscope image and a first predetermined number of the microscope images from the first reference microscope image in at least each of the first dimension and the second dimension of the two-or-more-dimensional array of microscope images; and transmitting each of the microscope images of the first batch of the microscope images, that have not been previously transmitted, to the client terminal for displaying the first reference microscope image and a next microscope image in the first batch in a first user-designated playback direction corresponding to one of the first dimension and the second dimension;

receiving, from the client terminal a second request corresponding to a second user-designated playback direction corresponding to one of the first dimension and the second dimension; and in response to receiving the second request:
selecting, as a second batch of the microscope images, a second reference microscope image and a second predetermined number of the microscope images from the second reference microscope image in the first dimension or the second dimension corresponding to the second user-designated playback direction; and transmitting each of the microscope images of the second batch of the microscope images, that have not been previously transmitted, to the client terminal for displaying the second reference microscope image and a next microscope image in the second batch in the second user-designated playback direction.

* * * * *